(12) United States Patent  (10) Patent No.: US 7,481,372 B2
Wulff et al.  (45) Date of Patent: Jan. 27, 2009

(54) RE-CONFIGURABLE TRIGGER ASSEMBLY (75) Inventors: Thomas Wulff, North Patchogue, NY (US); Azer Ilkhanov, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/950,953

(22) Filed: Dec. 5, 2007

(65) Prior Publication Data

US 2008/0164318 A1 Jul. 10, 2008

Related U.S. Application Data (63) Continuation of application No. 11/381,558, filed on May 4, 2006, now Pat. No. 7,306,156, which is a continuation of application No. 10/160,772, filed on Jun. 3, 2002, now Pat. No. 7,055,749.

(51) Int. Cl.
G06K 7/10 (2006.01)
(52) U.S. Cl. .............. 235/462.48; 235/462.45; 235/462.43
(58) Field of Classification Search ............ 235/462.48, 235/462.45, 462.43, 472.01, 440, 462.01, 235/441
See application file for complete search history.

(56) References Cited

U.S. PATENT DOCUMENTS

| 4,430,526 | A | 2/1984 | Brown et al. |
|---|---|---|---|
| 5,369,262 | A | 11/1994 | Dvorkis et al. |
| 5,600,105 | A | 2/1997 | Fukuzaki et al. |
| 5,606,614 | A | 2/1997 | Brady et al. |
| 5,610,386 | A | 3/1997 | Ball et al. |
| 5,656,805 | A | 8/1997 | Plesko |
| 5,689,285 | A | 11/1997 | Asher |
| 5,997,996 | A | 12/1999 | Tamura |
| 6,057,554 | A | 5/2000 | Plesko |
| 6,264,108 | B1 | 7/2001 | Baentsch |
| 6,275,138 | B1 | 8/2001 | Maeda |
| 6,313,731 | B1 | 11/2001 | Vance |
| 6,357,662 | B1 | 3/2002 | Helton et al. |
| 6,373,373 | B1 | 4/2002 | Saito |
| 6,388,556 | B1 | 5/2002 | Imai et al. |
| 6,420,956 | B1 | 7/2002 | Furudate et al. |
| 6,420,974 | B1 | 7/2002 | Baker et al. |
| 6,446,871 | B1 | 9/2002 | Buckley et al. |
| 6,450,046 | B1 | 9/2002 | Maeda |
| 6,466,198 | B1 | 10/2002 | Feinstein |
| 6,478,225 | B1 | 11/2002 | Swartz et al. |
| 6,563,415 | B2 | 5/2003 | Armstrong |

(Continued)

*Primary Examiner*—Edwyn Labaze
(74) *Attorney, Agent, or Firm*—Amin, Turocy & Calvin, LLP (57) ABSTRACT

Described is an improved trigger assembly for use in an electronic device. The trigger assembly includes a pressure sensitive member and a trigger button. The pressure sensitive member includes two or more conductive lines. The pressure sensitive member is secured to a portion of the mobile terminal. The trigger button is secured to the mobile terminal in a manner such that a force applied to the trigger button causes a resultant force to be applied on the pressure sensitive member. The force applied on the pressure sensitive member causes a change in an electrical property between at least two of the conductive lines. A module measures the electrical property between the conductive lines. A function of the device is initiated depending on a comparison of the measured electrical property to a threshold value.

19 Claims, 5 Drawing Sheets

U.S. PATENT DOCUMENTS

| | | | |
|---|---|---|---|
| 6,787,865 B2 * | 9/2004 | Endo et al. | 257/414 |
| 6,878,865 B1 | 4/2005 | Carrigan | |
| 2001/0011276 A1 | 8/2001 | Durst, Jr. et al. | |
| 2001/0017592 A1 | 8/2001 | Armstrong | |
| 2002/0020749 A1 | 2/2002 | Kato et al. | |
| 2002/0135565 A1 * | 9/2002 | Gordon et al. | 345/169 |

* cited by examiner

RE-CONFIGURABLE TRIGGER ASSEMBLY

CROSS-REFERENCE TO RELATED APPLICATIONS

This application is a continuation of U.S. patent application Ser. No. 11/381,558, filed on May 4, 2006, entitled "RE-CONFIGURABLE TRIGGER ASSEMBLY," and now U.S. Pat. No. 7,306,156, which is a continuation of U.S. patent application Ser. No. 10/160,772, filed on Jun. 3, 2002, entitled "RE-CONFIGURABLE TRIGGER ASSEMBLY," and now U.S. Pat. No. 7,055,749. The entireties of these applications are incorporated herein by reference.

BACKGROUND INFORMATION

Triggers or buttons are commonly used on electronic devices. For instance, triggers are employed on mobile computing terminals, bar code scanners, cellular phones, portable digital assistants (PDAs), etc. The trigger is used to initiate certain functions on the device. For instance, the trigger may activate a module to capture bar code information. The module may be a laser based bar code scanner or an imager. The trigger may also activate a speaker module for telephonic communication, it may activate a data transfer function or it may be used to navigate through menu options on a display.

Figure 1:
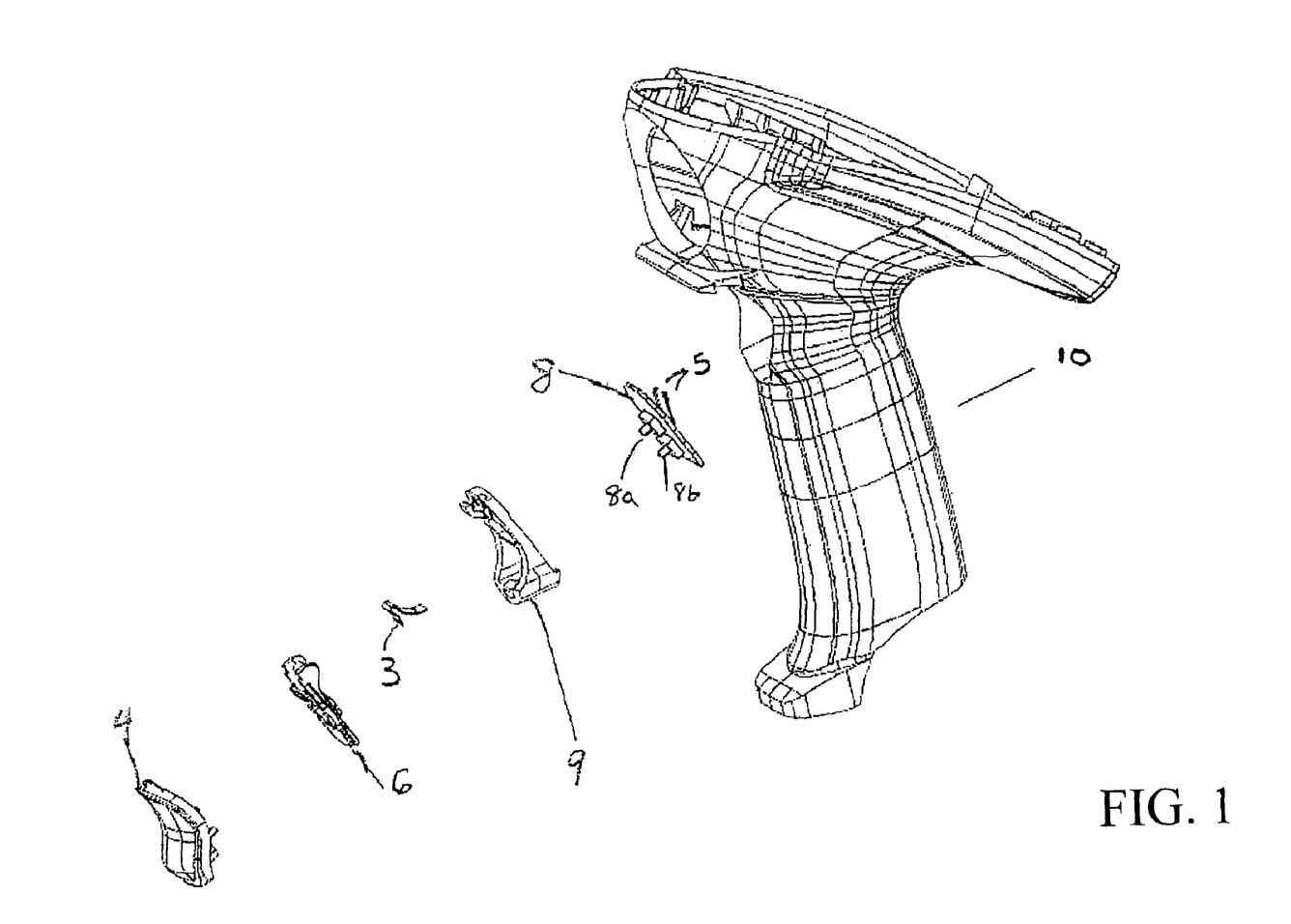
FIG. 1 shows a conventional trigger assembly used in a mobile terminal.

FIG. 1 shows a typical conventional trigger assembly for a mobile terminal. The assembly consists of several mechanical type components that are utilized to actuate electrical switch assembly 8 upon the depression of a trigger button 4. Switch assembly 8 has two switch elements 8a and 8b to activate two functions on the mobile terminal. Switch assembly 8 can include contacts 5 or wires/flex that connect to circuitry within the mobile terminal. A trigger housing 9 connects trigger button 4 with mobile terminal housing 10. A trigger bezel 6 connects trigger button 4 with trigger housing 9. A leaf spring 3 acts to restore trigger button 4 to its initial position after trigger button 4 is depressed. Sealing in terms of electrostatic discharge (ESD), water, and dust, requires the addition of gaskets to the trigger assembly.

The above-described trigger assembly has a number of shortcomings. The trigger assembly requires a user to assert a fixed amount of force and stroke in order to activate the trigger. Also, the trigger assembly must include gaskets to environmentally seal the terminal. Even with such gaskets, water and debris may still enter the terminal. In addition, the trigger assembly has a limited number of life cycles due to wear on the various moving parts. In addition, the trigger assembly requires a relatively significant amount of labor to manufacture.

SUMMARY OF THE INVENTION

Described is an improved trigger assembly for use in a mobile terminal or similar device. The trigger assembly includes a pressure sensitive member and a trigger button. The pressure sensitive member is secured to a portion of the mobile terminal. The trigger button is secured to the mobile terminal in a manner such that a force applied to the trigger button causes a resultant force to be applied on the pressure sensitive member.

The pressure sensitive member includes a connector that is coupled to circuitry on the mobile terminal. The assertion of a force on the trigger button changes electronic properties of the pressure sensitive member. In one embodiment of the invention, asserting a force on the trigger button causes a change in the electrical resistance the pressure sensitive member. For example, the force causes a conductive layer of the pressure sensitive member to come in contact with conductive traces within the pressure sensitive member. As the force increases (within a certain range), the electrical resistance of the conductive traces decreases. In another embodiment of the invention, asserting a force on the trigger button causes a change in the capacitance of the pressure sensitive member. In yet another embodiment, a piezoelectric element is included in the pressure sensitive member wherein when pressure is applied to the pressure sensitive member there is a change in potential between the opposite sides of piezoelectric element.

In a preferred embodiment of the present invention, at least a portion of the pressure sensitive member is insert molded into the mobile terminal housing, creating an integral seal.

In another aspect of the present invention, the triggering system includes a user force adjustment feature wherein a user can adjust the amount of force required to activate the trigger.

In yet another embodiment of the invention, the triggering system includes a user position adjustment feature, wherein a user can adjust the number of trigger positions, i.e., 1, 2, or 3 positions, for activation of several different features.

In yet another embodiment of the invention, the triggering system includes a pressure sensitive member that includes multiple pressure sensitive target areas which would enable a user to activate several different features by depressing different areas of the trigger.

In yet another embodiment of the invention, the triggering system includes a tactile or audio feedback mechanism.

These and other objects, advantages and features of the invention will become better understood with regard to the following description, appended claims and accompanying figures.

DETAILED DESCRIPTION

Figure 2:
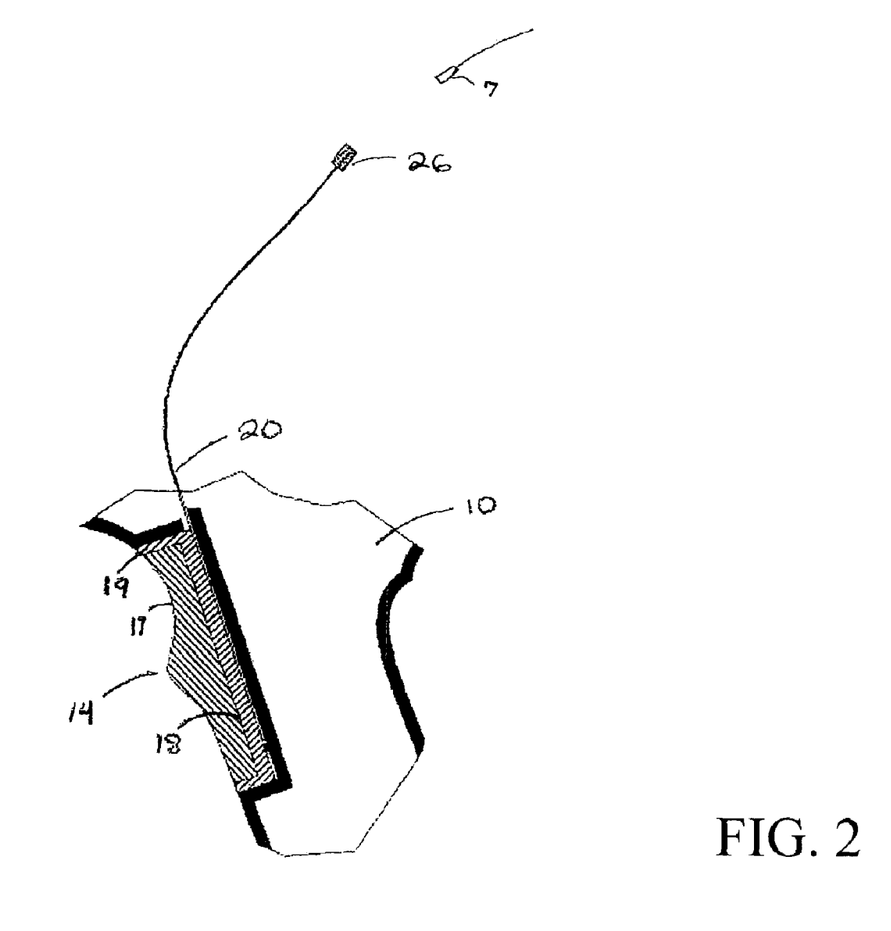
FIG. 2 shows an exemplary embodiment of a trigger assembly according to the present invention including a portion of a housing of a mobile terminal.
Figure 3:
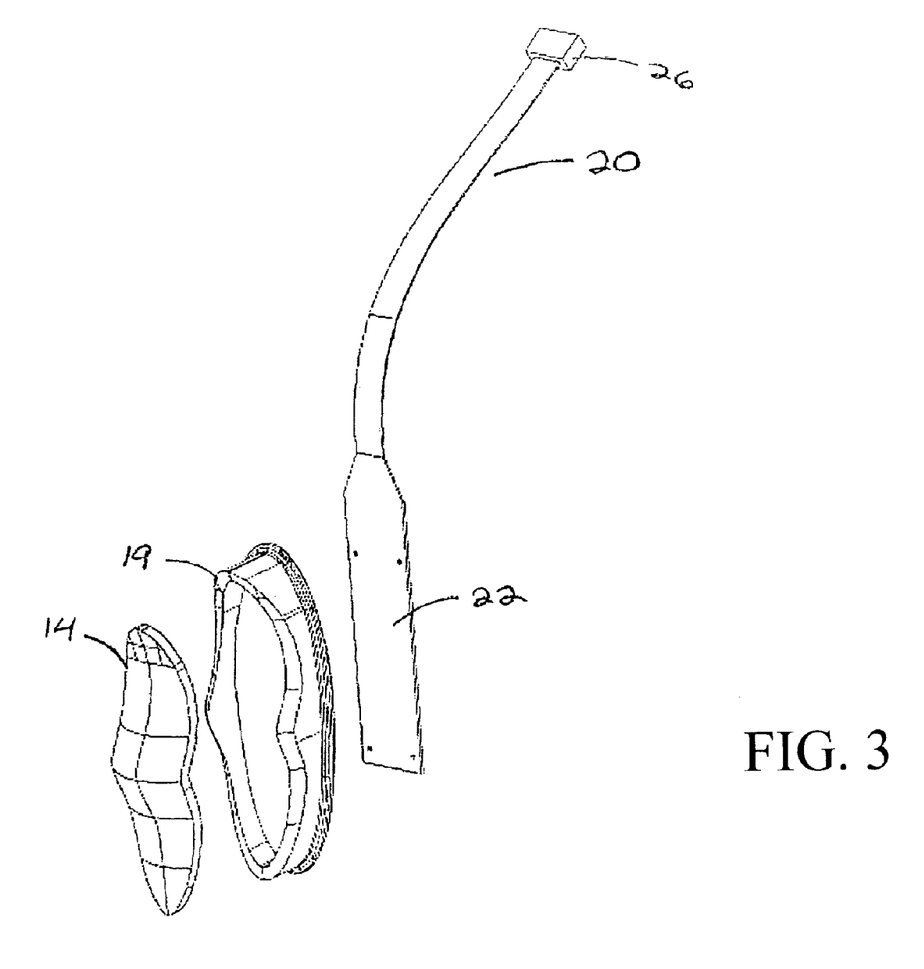
FIG. 3 shows an exploded view of a trigger assembly of a preferred embodiment of the present invention.

FIG. 2 shows a portion of a mobile terminal housing 10 having a triggering assembly according to the present invention. FIG. 3 shows an exploded view of the trigger assembly. The triggering assembly includes a trigger button 14 and a pressure sensitive member 20. A trigger housing 19 connects trigger button 14 with mobile terminal housing 10. Trigger housing 19 is preferable comprised of a rubber over mold. Trigger button 14 is secured to trigger housing 19 via an interface fit or other fastening techniques known to those of skill in the art. Trigger button 14 includes a front section 17 for engagement with one or more of the user's fingers. Opposite front section 17 of trigger button 14 is a back section 18. When a user engages trigger button 14, back section 18 asserts a force on trigger housing 19 which asserts a force on a target area 22 of pressure sensitive member 20. In an alternative embodiment of the invention the trigger button could directly assert the force on the target area of the pressure sensitive member.

In a preferred embodiment of the present invention, pressure sensitive member 20 is insert molded into mobile terminal housing 10. The techniques for molding pressure sensitive member 20 into mobile terminal housing 10 are those traditionally used in the plastic molding industry. The molded trigger assembly of the present invention is more environmentally sealed than traditional triggering assemblies that tend to rely on elastic gaskets. Gaskets may allow the passage of water and debris into the mobile terminal and eventually wear after repeated use. In addition, tooling parts to manufacture the gaskets and labor costs to install the gaskets are eliminated under the present invention. In another embodiment of the present invention, an adhesive material is applied between pressure sensitive member 20 and mobile terminal housing 10 to secure the two components.

Figure 4:
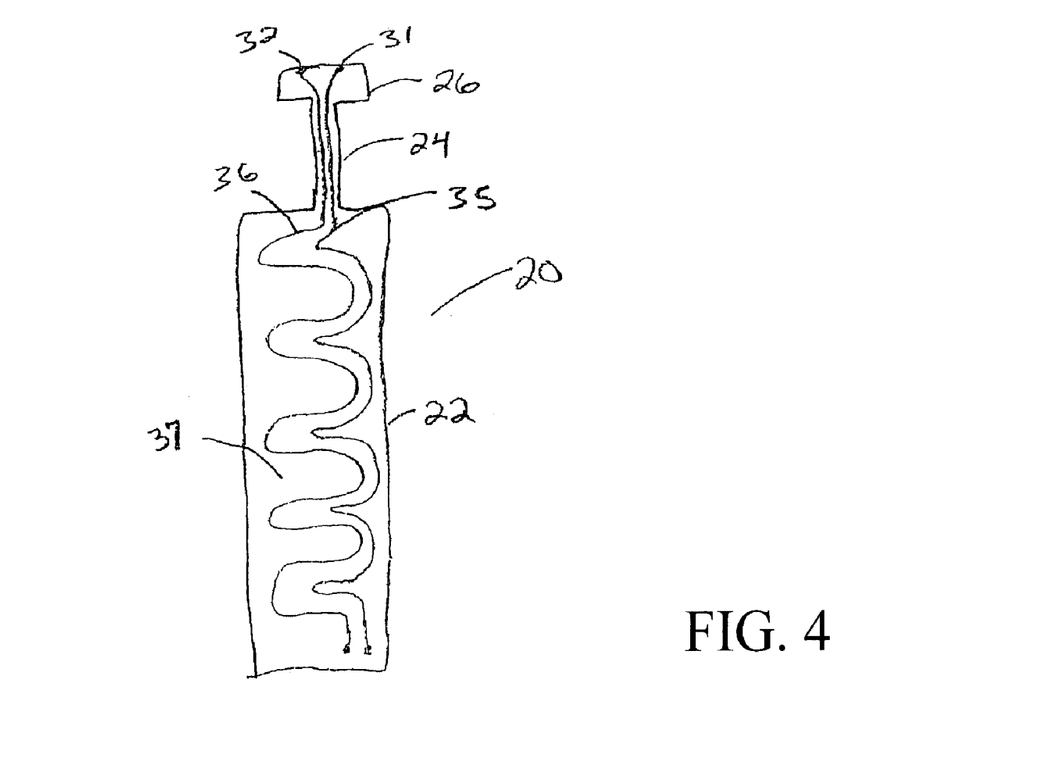
FIG. 4 shows a pressure sensitive member of a preferred embodiment of the present invention.

FIG. 4 shows an exemplary embodiment of pressure sensitive member 20 according to the present invention. Target area 22 of pressure sensitive member 20 is connected to flexible tail 24. Flexible tail 24 is connected to a connector 26. Connector 26 electrically couples pressure sensitive member 20 to a circuitry on the mobile terminal.

The operation of a preferred embodiment of pressure sensitive member 20 will now be described with reference to FIGS. 2 and 4. Connector 26 includes two contacts, 31 and 32, that interface with contacts within the mobile terminal. Electrically connected to contacts 31 and 32 within pressure sensitive member 20 are, respectively, conductive traces 35 and 36. Within target area 22, conductive traces 35 and 36 are arranged in a pattern that covers a substantial portion of the surface area of target area 22. Preferably, conductive traces 35 and 36 are arranged in a zigzag pattern. One skilled in the art would recognize that the conductive traces could be configured in a number of different patterns without departing from the nature of the present invention. Conductive traces 35 and 36 terminate at a distal end of pressure sensitive member 20. There is a gap between conductive trace 35 and conductive trace 36. Pressure sensitive member 20 includes a conductive layer 37 in longitudinal relation to conductive traces 35 and 36. Conductive lay 37 may be located either under and/or over conductive traces 35 and 36. Conductive layer 37 could be comprised of a number of different conductive materials. In a preferred embodiment, conductive layer 37 is comprised of conductive rubber. Pressure sensitive member 20 is configured such that when there is no pressure applied on it, no electric current (or very little current) will flow between conductive trace 35 and conductive trace 36. As pressure is applied to pressure sensitive member 20, conductive layer 37 comes in contact with conductive traces 35 and 36. Thus, conductive layer 37 enables an electric current to flow between conductive trace 35 and conductive trace 36. As more pressure is applied to pressure sensitive member 20, the contact between conductive layer 37 and conductive traces 35 and 36 improves (decreasing the electrical resistance). As a result, as the pressure applied to pressure sensitive member 20 increases, the current flow between conductive traces 35 and 36 increases (within a certain range of pressure).

Connector 26 is fastened to a terminal connector 7 within the mobile terminal. Circuitry within the mobile terminal measures the current between conductive traces 35 and 36. In one embodiment of the invention, the measured current is compared to a threshold value. If the measured current between conductive traces 35 and 36 is more than the threshold value, a certain function of the mobile terminal is activated. For instance, if the measured current exceeds the threshold value, the mobile terminal will scan a bar code with a laser-based scanner, take an image using an imaging module, activate a microphone on a telephonic communication module or send data over a wireless network. If the measured current is less than the threshold value, the functionality of the mobile terminal will not be activated.

In one embodiment of the present invention, different functions of the mobile terminal can be activated depending on the amount of force a user applies to the trigger button 14. For instance, if the measured current between conductive traces 35 and 36 is between an initial threshold and a second threshold, a first function of the mobile terminal is activated. In the event the measured current between conductive traces 35 and 36 is between the second threshold and a third threshold, a second function of the mobile terminal is activated. In a similar manner, the system could be designed to activate more than two functions of the mobile terminal.

Figure 7:
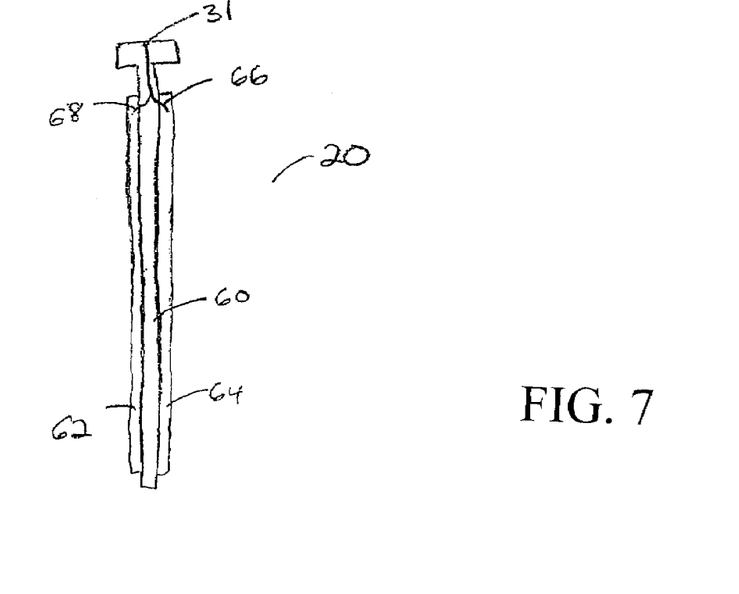
FIG. 7 shows a side view of an alternative embodiment of the pressure sensitive member of the present invention.

The embodiments described above are based on measuring a current that flows between two conductive traces. One skilled in the art would recognize that other electrical signals could be measured to detect the force applied to the trigger button without departing from the nature of the invention. For instance, the assertion of force on the pressure sensitive member could cause a measurable change in capacitance or voltage. FIG. 7 shows a side view of an alternative embodiment of pressure sensitive member 20 of the present invention. Pressure sensitive member 20 includes a dialectic material 50. On opposite sides of dialectic material 50 are a first conductive layer 62 and a second conductive layer 64. First conductive layer 62 and second conductive layer 64 are connected, respectively, to conductive traces 68 and 66. Conductive trace 66 is connected to contact 31. Conductive trace 68 is connected to contact 32 (not shown in FIG. 7). As recognized by those skilled in the art, when a pressure is applied to first conductive layer 62 and/or second conductive layer 64 such that the distance between the two layers changes, the capacitance measured between contacts 31 and 32 changes. The change in capacitance can be measured at contacts 31 and 32 to detect the amount of force asserted on pressure sensitive member 20. The measured change in capacitance between contacts 31 and 32 is compared to a threshold value. In a manner similar to the embodiment described above, if the measured current between contacts 31 and 32 is more than the threshold value, a certain function of the mobile terminal is activated.

In a preferred embodiment of the invention, the amount of force required to activate a function of the mobile terminal is user adjustable. Preferably, this is accomplished by adjusting the threshold value necessary to activate the function of the mobile terminal. A user who wants to change the sensitivity of the trigger can put the mobile device in trigger adjustment mode. This may be done via a user interface, e.g., a touch screen display. In a preferred embodiment, the user sets the threshold value by putting the mobile device in the trigger adjustment mode and pressing the trigger. The amount of force the user asserts is used to set the threshold value.

In another embodiment of the invention, the user can adjust the threshold value by scanning barcodes dedicated to that function. For instance, a user manual for the mobile terminal could include trigger force adjustment barcodes that correspond to light force, medium force and heavy force. The user could simply scan the barcode that corresponds to the setting preferred by the user.

In one embodiment of the invention, after a user enters a user identification code into the mobile terminal, the system automatically sets the threshold value to that user's preferred, preset threshold setting. The mobile terminal accesses a database (located either remotely or locally) that matches the user identification codes to a preferred threshold setting. After the user enters his or her identification code, the system determines the correct threshold value and sets it for that particular user.

Figure 5:
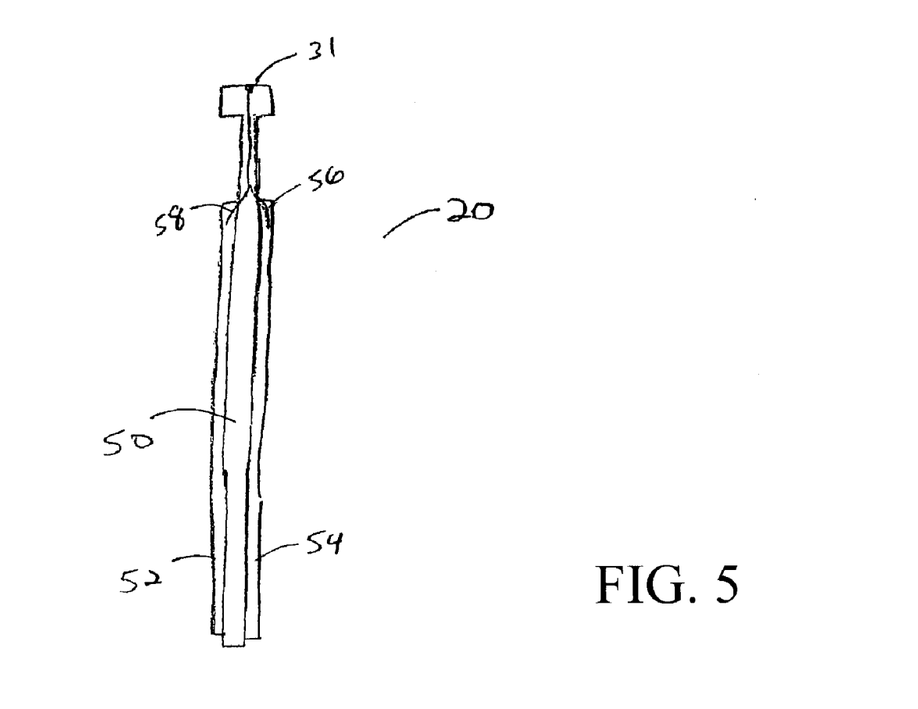
FIG. 5 shows a side view of an alternative embodiment of the pressure sensitive member of the present invention.

FIG. 5 shows a side view of an alternative embodiment of pressure sensitive member 20 of the present invention that includes piezoelectric components. Pressure sensitive member 20 includes a piezoelectric component such as a piezoceramic 50. On opposite sides of piezoceramic 50 are a first conductive layer 52 and a second conductive layer 54. First conductive layer 52 and second conductive layer 54 are connected, respectively, to conductive traces 58 and 56. Conductive trace 56 is connected to contact 31. Conductive trace 58 is connected to contact 32 (not shown in FIG. 5). As recognized by those skilled in the art, when a pressure is applied to piezoceramic 50, there is a change in potential between the opposite sides of piezoceramic 50. The change in potential can be measured at contacts 31 and 32 to detect the amount of force asserted on pressure sensitive member 20. The measured change in potential between contacts 31 and 32 is compared to a threshold value. In a manner similar to the embodiment described above, if the measured current between contacts 31 and 32 is more than the threshold value, a certain function of the mobile terminal is activated.

Figure 6:
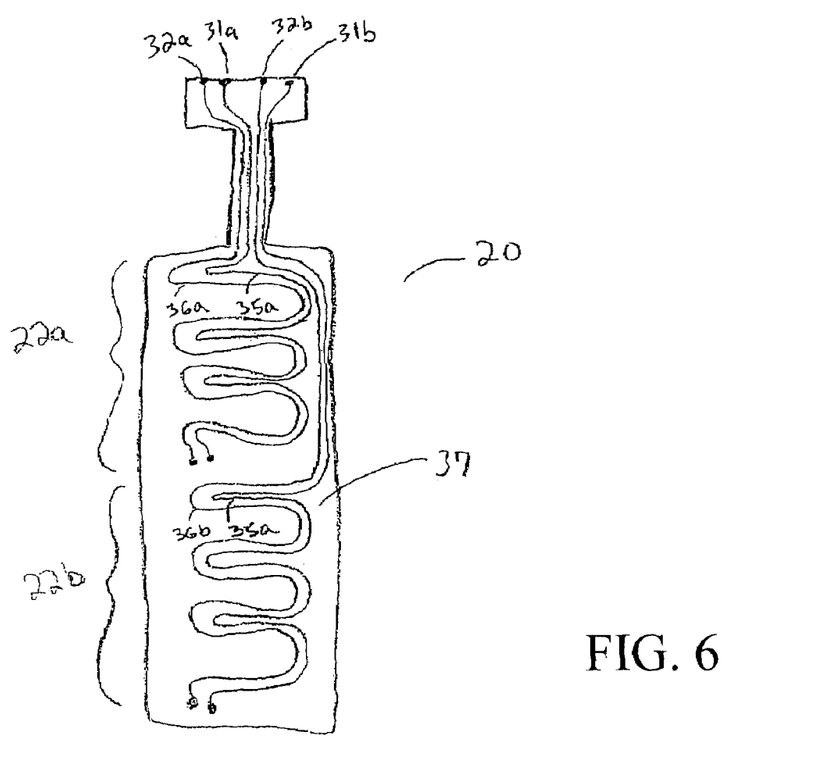
FIG. 6 shows another alternative embodiment of the pressure sensitive member of the present invention.

FIG. 6 shows an embodiment of pressure sensitive member 20 having two pressure sensitive target areas 22a and 22b. This embodiment is used to activate multiple functions of the mobile terminal. When a user presses the trigger button with one of his fingers, a force is applied to target area 22a activating a particular function of the mobile terminal. When the user presses the trigger button with another finger, a force is applied to target area 22b activating another function of the mobile terminal. This embodiment of the invention operates in a manner similar to that described above except that there are two pairs of conductive traces, 35a, 36a and 35b, 36b, and two pairs of contacts 31a, 32b and 31b and 32b. A force applied to target area 22a is detected by measuring the current between 32a and 31a. A force applied to target area 22b is detected by measuring the current between 32b and 31b. In alternative embodiments of the invention, pressure sensitive member 20 could have more than two pressure sensitive target areas. One skilled in the art would recognize that the multiple pressure sensitive mode described herein could also be accomplished by using piezoceramic elements with pressure sensitive member 20 in a manner similar to that described above.

In one embodiment of the invention, the functions activated on the mobile terminal could be initiated depending on a combination of the user's finger assertions. For instance, consider an embodiment wherein the pressure sensitive member 20 includes three target areas, T1, T2 and T3. When a user asserts a force on any one of these target areas, a particular function, e.g., F1, F2 or F3, of the mobile terminal is initiated. If forces are asserted simultaneously on T1 and T2, a fourth function, F4, could be initiated. Likewise, the assertion of forces simultaneously on T1 and T3 could result in a fifth function, F5, could be initiated. In addition, as described above, each target area could activate multiple functions depending upon the amount for force applied to the target area. This significantly increases the number of functions that can be activated by the trigger button. In the embodiment described herein, the functionality of the mobile terminal could be controlled in a manner analogous to a musical instrument. While it is recognized that it may take a great deal of practice to become proficient at applying the various combinations of forces and/or amounts of forces on the trigger button, the benefits are significant. The user of a mobile device that has multiple functions can activate multiple functions in an instant with a single hand.

In a preferred embodiment of the invention, the trigger assembly includes a tactile feedback mechanism. After the amount of force asserted on the trigger button exceeds the threshold value, the tactile feedback mechanism creates a slight movement in the trigger button to allow a user to feel that the trigger assembly was properly engaged. The tactile feedback in the trigger button could be created by a small solenoid or spring within the trigger assembly.

In another preferred embodiment of the invention, the trigger assembly includes an audio feedback mechanism. The audio feedback could be generated within a speaker on the mobile terminal. Preferably, the speaker is the main speaker used in the mobile terminal. After the amount of force asserted on the trigger button exceeds the threshold value, the system sends an audio signal to the speaker. In a preferred embodiment, the sound from the speaker is user selectable. The user can select from a list of sounds that he or she would like the terminal to make in response to a trigger actuation. In an embodiment of the invention where there are multiple functions activated by the trigger assembly, the trigger assembly could be configured so that the speaker makes different sounds depending upon the function by activated.

The embodiments described above are described with respect to a trigger button on a handle on a mobile terminal. It should be recognized that the trigger assembly of the present invention could be located on other areas of the mobile terminal. For instance, the trigger button could be located on the side or face of the mobile terminal.

The herein described embodiments of the present invention are intended to provide the preferred embodiments of the present inventions currently contemplated by the applicant. It would be obvious to any one of skill in the relevant art, based on the herein described examples that numerous modifications could be made to the described preferred embodiments without straying from the present invention. Accordingly, the herein described embodiments are merely exemplary in nature and are not intended to represent every possible embodiment of the present invention.

What is claimed is:

1. An apparatus comprising:
    a pressure sensitive member that includes a plurality of pressure sensitive target areas that respectively vary electric current or voltage values as a function of pressure applied respectively thereto;
    a trigger that selectively applies pressure to the pressure sensitive member to activate one or more functions of a host device, wherein thresholds for electric current or voltage values that respectively activate the one or more functions of the host device are user configurable; and
    a memory for storing a database containing user identification codes and corresponding user configurations, wherein the apparatus can identify a user as a function of the user identification codes, and apply a configuration corresponding to the user.

2. The apparatus of claim 1, further comprising a force adjustment feature that allows a user to adjust force required to activate the one or more functions of the host device.

3. The apparatus of claim 1, wherein at least a portion of the pressure sensitive member is insert-molded into a housing of the apparatus to form an integral seal.

4. The apparatus of claim 1, wherein the apparatus provides tactile feedback.

5. The apparatus of claim 1, further comprising a plurality of comparators that compare electric current or voltage values in the pressure sensitive member with the thresholds for electric current or voltage values that activate the one or more functions of the host device.

6. The apparatus of claim 1, wherein the thresholds for electric current or voltage values that activate the one or more functions of the host device are adjustable via a user scan of a barcode.

7. The apparatus of claim 1, wherein the thresholds for electric current or voltage values that activate the one or more functions of the host device are adjustable via an adjustment mode of the apparatus.

8. The apparatus of claim 1, further comprising a unit that measures electrical properties of the pressure sensitive member.

9. The apparatus of claim 1, wherein the pressure sensitive member comprises at least one of a piezoceramic element, dielectric material, or capacitance, and wherein the capacitance varies as a function of pressure applied to the pressure sensitive member.

10. The apparatus of claim 1, wherein the pressure sensitive member includes conductive lines, wherein electrical properties vary between the conductive lines.

11. A method comprising:
selectively applying pressure to a pressure sensitive member of a portable unit to activate one or more functions of a host device;
varying electric current or voltage values as a function of pressure selectively applied to a plurality of pressure sensitive target areas of the pressure sensitive member;
activating one or more functions of the host device as a function of the electric current or voltage values; and
adjusting thresholds of electric current or voltage values that activate the one or more functions of the host device as a function of a user identification code.

12. The method of claim 11, further comprising:
adjusting force required to activate the one or more functions of the host device.

13. The method of claim 11, further comprising:
providing tactile feedback to a user.

14. The method of claim 11, further comprising:
storing user identification codes and corresponding user configurations;
identifying a user as a function of the identification codes; and
applying a configuration corresponding to the user.

15. The method of claim 11, further comprising:
comparing electric current or voltage values in the pressure sensitive member with the thresholds of electric current or voltage values that activate the one or more functions of the host device.

16. The method of claim 15, further comprising at least one of:
adjusting the thresholds of electric current or voltage values that activate the one or more functions of the host device via at least one of a user scan of a barcode or an adjustment mode of the apparatus.

17. The method of claim 11, further comprising measuring electrical properties of the pressure sensitive member.

18. The method of claim 11, further comprising at least one of:
varying capacitance of the pressure sensitive member as a function of pressure applied to the pressure sensitive member; or
varying electrical properties between conductive lines.

19. An apparatus comprising:
means for selectively applying pressure to a pressure sensitive member of a portable unit to activate one or more functions of a host device;
means for varying electric current or voltage values as a function of pressure selectively applied to a plurality of pressure sensitive target areas of the pressure sensitive member;
means for activating one or more functions of the host device as a function of the electric current or voltage values; and
means for adjusting thresholds of electric current or voltage values that activate the one or more functions of the host device as a function of a user identification code.

* * * * *